R. G. DOWINS.
GAS AND AIR MIXING DEVICE.
APPLICATION FILED JUNE 28, 1911.
1,013,000.
Patented Dec. 26, 1911.
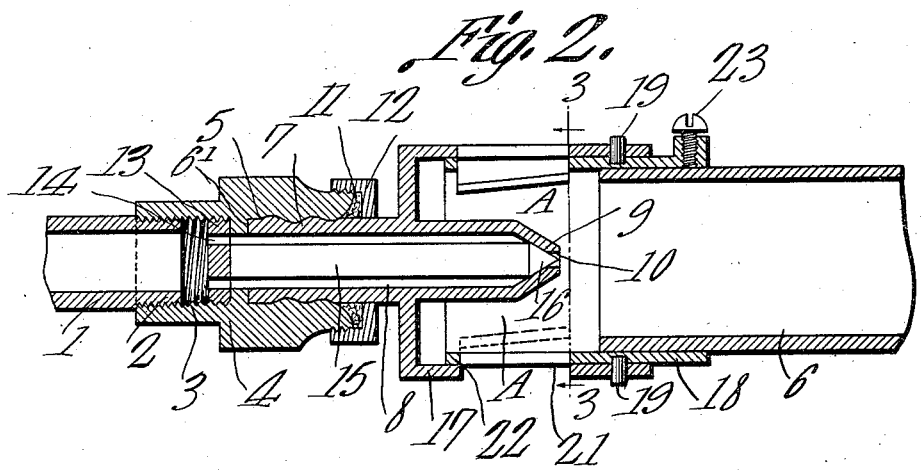
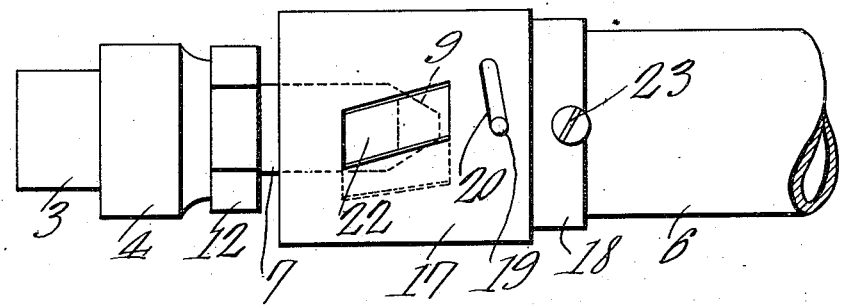
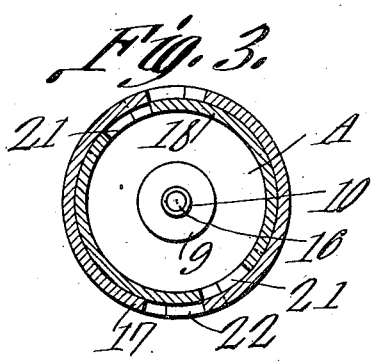
Richard G. Dowins,
Inventor
Witnesses
by
Attorneys

UNITED STATES PATENT OFFICE.

RICHARD G. DOWINS, OF NEODESHA, KANSAS, ASSIGNOR OF ONE-HALF TO McCLURE BUTCHER, OF NEODESHA, KANSAS.

GAS AND AIR MIXING DEVICE.

1,013,000.  Specification of Letters Patent.  Patented Dec. 26, 1911.

Application filed June 28, 1911. Serial No. 635,742.

*To all whom it may concern:*

Be it known that I, RICHARD G. DOWINS, a citizen of the United States, residing at Neodesha, in the county of Wilson and State of Kansas, have invented a new and useful Gas and Air Mixing Device, of which the following is a specification.

This invention relates to improvements in gas and air mixing valves, the primary object of this invention being the provision of a valve for admitting gas and air to burners of stoves and the like, whereby the proper ratio of the gas to the air is insured at all times whether the flame be high or low.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a side elevation of a complete apparatus in operable connection. Fig. 2 is a vertical central sectional view thereof. Fig. 3 is a section taken on line 3—3 of Fig. 2 looking in the direction of the arrows.

Referring to the drawings, the numeral 1 designates the gas supply pipe, which is provided with a threaded end to which is connected the threaded sleeve 2 of the coupling member 3 provided with an annular shoulder 4, the air and gas conducting pipe 6 being connected beyond the mixing device.

The mixing device, as shown, comprises an annular shoulder 4 provided with the central bore 5 terminating in the shoulder 6' and having rotatably and concentrically mounted therein the tubular sleeve 7 providing a chamber 8 and said sleeve having a tapered outer end 9 provided with the gas outlet opening 10. In order to produce a gas tight joint around the sleeve 7, a packing 11 and clamping nut 12 are employed. The outer threaded end or bar 13 is provided with a series of apertures 14, which permit the gas to flow from the pipe 1 into the concentric chamber 8 around the needle valve 15, which is carried concentrically of the disk or bar 13 within the sleeve 7 and has its inner pointed end disposed to operate within the tapered end 9 to control the flow of gas through the aperture or opening 10 of said sleeve 7 and project the gas into the mixing chamber A, where it will mix with the air therein by the pressure of the gas directed into the sleeve 7.

Formed integral with the sleeve 7 and therefore rotatable therewith, is a casing or shutter 17 which fits over and rotates upon the stationary shutter or sleeve 18, the said rotatable shutter 17 being given a slightly sliding or spiral movement during its rotation by means of the large threaded portion of the bore 5 and sleeve 7, while the pins 19 and slots 20, coactively connect the respective shutters 17 and 18 together, so that the respective air openings 21 and 22 thereof will be brought into and out of alinement, so as to regulate the supply of air therethrough into the mixing chamber and pipe 6 in proportion to and according to the amount of gas that is permitted to pass out of the aperture 10 of the tube 7, these apertures being so disposed with relation to the tip of the casing 7 as to have the air drawn into said casing through the apertures, and thoroughly mix it with the gas therein and feed it in such mixed condition through the conduit 6 to the proper burners.

In order to lock the stationary sleeve or shutter 18 upon the pipe 6, the screw 23 is provided.

From the foregoing description it will be seen that the needle valve 15 after being adjusted in the threaded portion, remains stationary within the sleeve 7 and that to regulate the flow of gas and the proportionate amount of air, to the pipe 6, it is simply necessary to rotate the shutter 17, which rotation will cause the casing or sleeve 7 to be rotated and moved longitudinally so as to permit the gas to flow from the conduit 1 through the apertures 14 and into the concentric chamber 8 about the needle valve 15 and out through the aperture 10 thereof where the flow of gas will commingle with the streams of air coming into the mixing chamber from other directions, thus providing a gas and air mixture proportionate at all times and insuring at the burner the greatest unit of heat.

What is claimed is:

The combination with a stationary gas supply pipe and a stationary gas and air conducting pipe spaced apart and in alinement, of a gas and air regulating and mixing device interposed therebetween and comprising a coupling fixedly connected to the gas supply pipe and having an oppositely disposed interiorly threaded socket, a needle seated upon the end of said gas supply pipe within the gas supply pipe receiving end of the coupling and disposed concentrically through the coupling and projecting beyond the socketed end thereof, a sleeve surrounding said needle and having threads fitting the threads of the interiorly threaded socket of the coupling carried by the gas supply pipe to impart longitudinal movement to the sleeve when the sleeve is rotated, said sleeve having a gas outlet tip controlled by the needle, a cylindrical member of larger diameter than the sleeve carried thereby and surrounding and beyond its outlet tip, said member being provided with apertures in the walls thereof, another cylindrical member fixedly connected to and carried by the gas and air conducting pipe and telescopically engaging the first cylindrical member, said last cylindrical member being provided with apertures in the wall thereof to register with the apertures of the other member, and means to hold the members relatively to each other.

In testimony that I claim the foregoing as my own, I have hereto affixed my signature in the presence of two witnesses.

RICHARD G. DOWINS.

Witnesses:
 JOHN J. SEAMAN,
 F. A. BRADFIELD.

---

Copies of this patent may be obtained for five cents each, by addressing the "Commissioner of Patents, Washington, D. C."